United States Patent [19]

Szirtes

[11] Patent Number: 5,322,384
[45] Date of Patent: Jun. 21, 1994

[54] LINEAR LATCH

[75] Inventor: Thomas Szirtes, Willowdale, Canada

[73] Assignee: Spar Aerospace Limited, Mississauga, Canada

[21] Appl. No.: 952,686

[22] Filed: Sep. 28, 1992

[51] Int. Cl.⁵ .................................. F16B 2/00
[52] U.S. Cl. ............................ 403/343; 403/321; 403/322; 403/314; 24/637
[58] Field of Search ............. 403/321, 322, 325, 373, 403/374, 343, 314, DIG. 4; 292/DIG. 72, DIG. 7, 258, 257, 306; 24/134 R, 134 KB, 134 L, 637

[56] References Cited

U.S. PATENT DOCUMENTS

| | | | |
|---|---|---|---|
| 434,691 | 8/1890 | Wilcox | 24/134 R |
| 481,179 | 8/1892 | Klein | 24/134 L |
| 920,820 | 5/1909 | Brown | 24/134 R |
| 945,081 | 1/1910 | Burt | 24/134 R |
| 2,387,436 | 10/1945 | Frank | 403/314 |
| 2,432,278 | 12/1947 | Bratz | 403/322 |

FOREIGN PATENT DOCUMENTS 3213405 10/1983 Fed. Rep. of Germany ...... 403/321

Primary Examiner—Dave W. Arola
Assistant Examiner—Anthony Knight

[57] ABSTRACT

Apparatus to axially hold a featureless shaft has an abutment for abutting the side of the shaft and a cam to wedge the shaft against the abutment. The cam has a convexly radiused face which is generally opposed to the abutment. The generating radius for the face is offset from the pivot axis of the cam in the direction in which a shaft is inserted into the apparatus. Consequently, once the cam wedges the shaft against the abutment any withdrawal force on the shaft will tighten the wedging effect since the eccentric radiused face will attempt to move closer to the abutment.

8 Claims, 6 Drawing Sheets

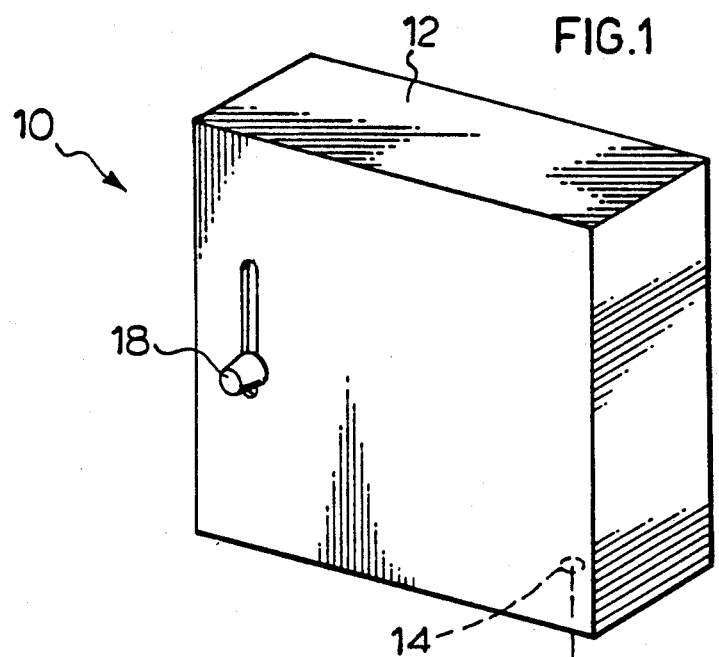
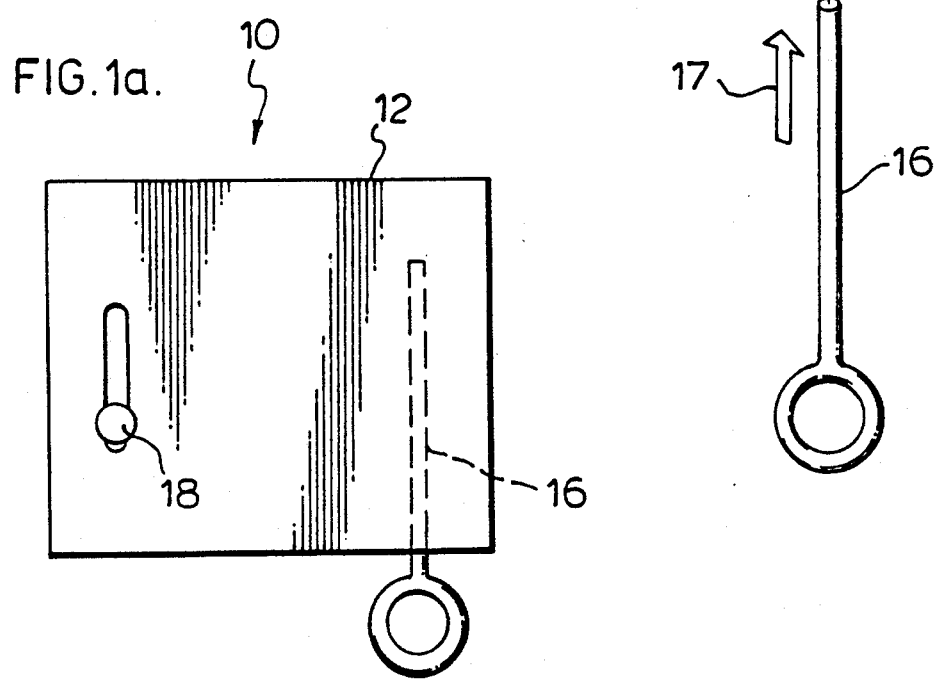

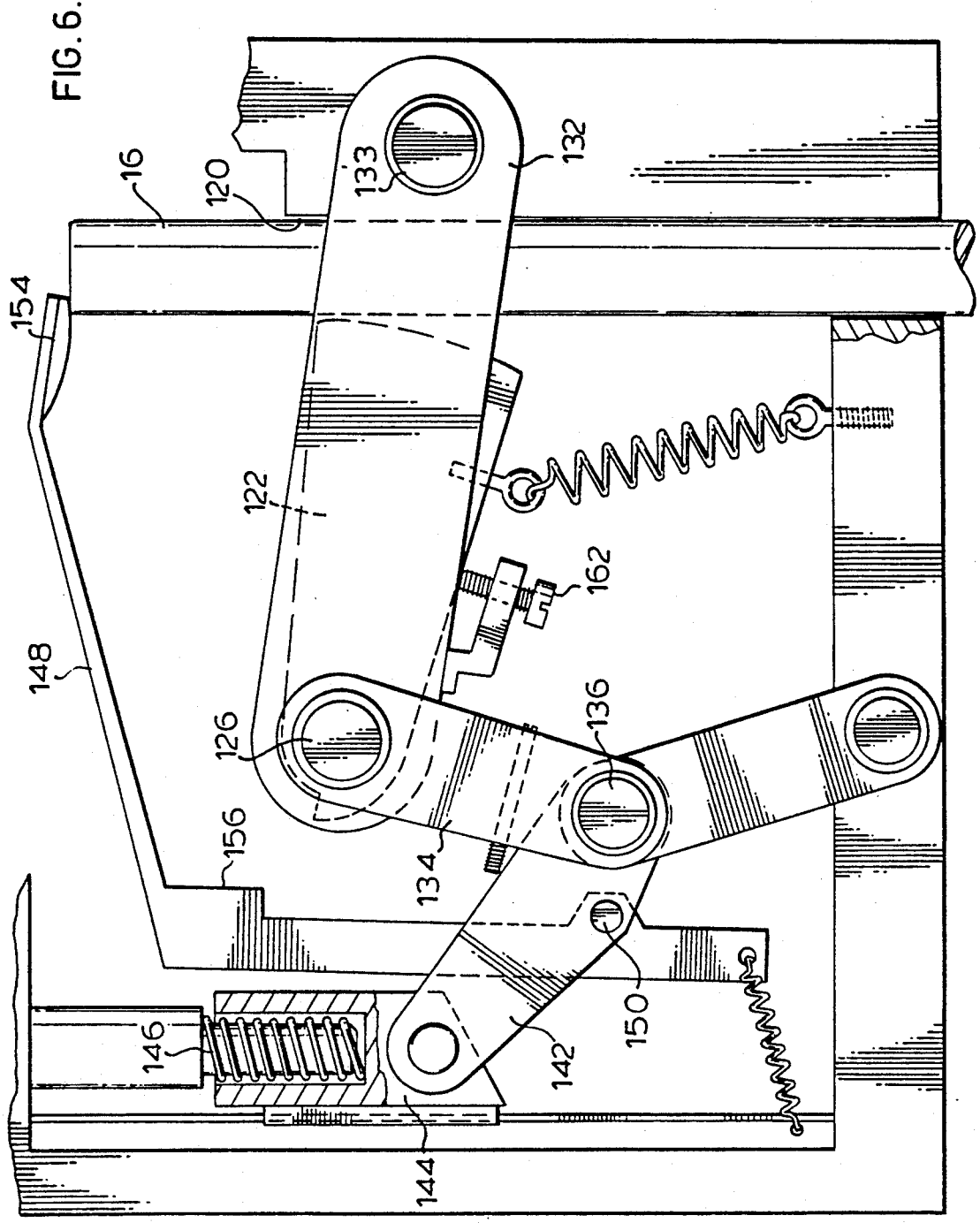

LINEAR LATCH

BACKGROUND OF THE INVENTION

1. Field of the Invention

This invention relates to an apparatus for holding a shaft which is inserted axially therein in an insertion direction to a holding position.

2. Description of the Related Art

For certain towing applications, such as a tug towing a ship or an airplane towing a glider, the joint between the craft must be strong but able to be released under load. This invention seeks to provide an apparatus meeting these criteria.

A tool to be held in machinery would desirably terminate in a featureless (i.e., smooth) shaft so that the tool could be inserted in any axial orientation and be held against axial withdrawal. This invention seeks to provide an apparatus meeting these criteria.

SUMMARY OF THE INVENTION

According to the present invention, there is provided apparatus for holding a shaft which is inserted axially therein in an insertion direction to a holding position, comprising: a fixed abutment for abutting the side of a shaft; a cam terminating in a convexly radiused face, said cam mounted for rotation about a cam pivot through an arc such that said face remains generally opposed to said abutment, said cam pivot being beside said abutment and oriented such that a shaft, when abutting said abutment, is in the plane of rotation of said cam; the centre of the generating radius of said radiused face being offset from said cam pivot generally in said insertion direction; means for urging said cam to rotate about said cam pivot in a direction opposite said insertion direction; and a translatable pivot mount for translating said cam pivot to a first position more proximate to said abutment and to a second position more distal from said abutment such that, when said cam pivot is in said first position, said radiused face of said cam abuts a shaft inserted axially along said abutment in said insertion direction to said holding position, and when said cam pivot is translated to said second position by said translatable pivot mount, said radiused face is drawn out of abutment with any shaft at said holding position, whereby a shaft inserted to said holding position when said cam pivot is in said first position is wedged between said abutment and said cam face and any withdrawal force on said shaft wedges said shaft more tightly between said cam face and said abutment and whereby when said cam pivot is moved to said second position, said shaft is released.

BRIEF DESCRIPTION OF THE DRAWINGS

In the figures which disclose example embodiments of the invention,

FIG. 1 is a perspective view of a housing for apparatus made in accordance with this invention, shown with a featureless shaft;

FIG. 1a is a front view of FIG. 1 showing a shaft inserted in the housing,

FIGS. 4 through 6 are front views of the apparatus made in accordance with this invention showing the operation of the apparatus.

DESCRIPTION OF PREFERRED EMBODIMENTS

Figure 2:
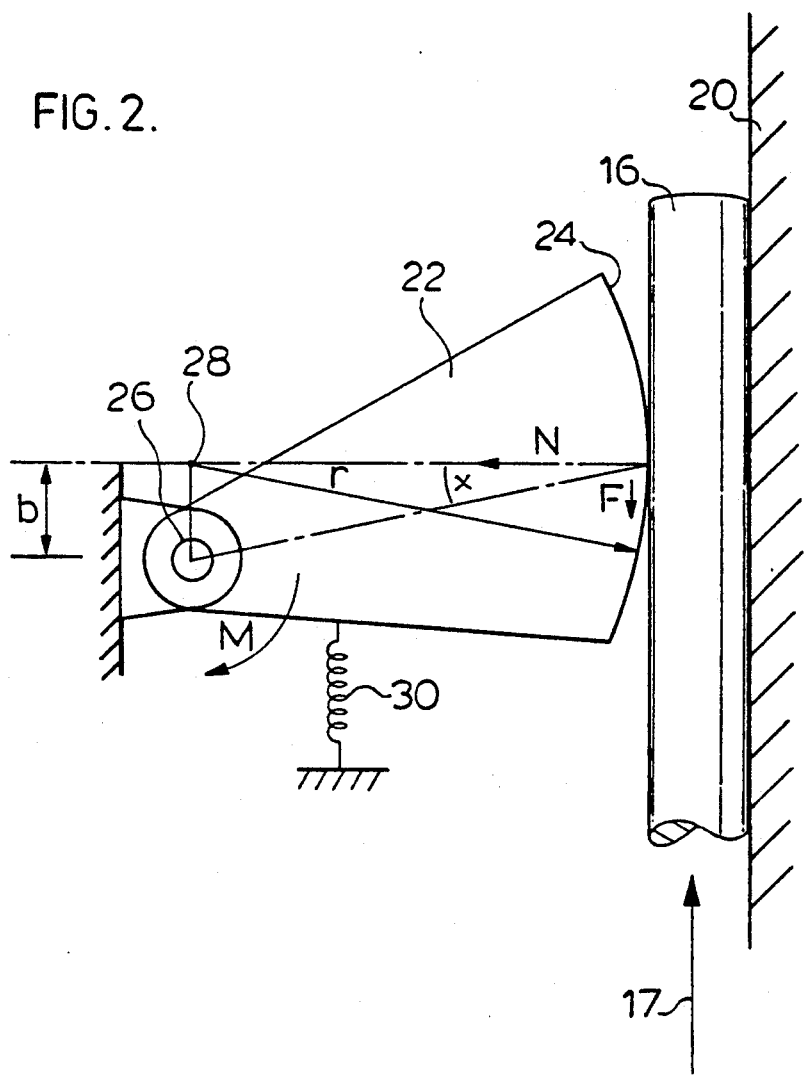
FIG. 2 is a schematic view showing the principle of apparatus made in accordance with this invention.

With reference to FIGS. 1 and 1a, the apparatus 10 of this invention has a housing 12 with a shaft receiving opening 14 for reception of a featureless (i.e., smooth) shaft 16 which is inserted axially into the opening in an insertion direction 17. The housing also has a shaft releasing lever 18.

Turning now to FIG. 2, which illustrates the principle of operation of the apparatus inside housing 12, an abutment 20 is provided to abut the side of featureless shaft 16. A cam 22, which terminates in a convexly radiused face 24, is mounted for rotation about a pivot 26. Pivot 26 is positioned beside abutment 20 and oriented such that the shaft 16, when abutting abutment 20, is in the plane of rotation of the cam.

The cam 22 is intended to pivot through an arc such that face 24 remains generally opposed to abutment 20. Centre 28 of the generating radius r of the radiused face 24 is offset from the pivot 26. With the face 24 of the cam opposed to the abutment, the centre of the generating radius is offset from the pivot 26 in (more or less) the insertion direction 17. The magnitude of the offset is indicated as b. A light spring 30 is provided in order to urge the cam to rotate about the pivot in a direction M opposed to the insertion direction 17. With this arrangement, the cam is urged into abutment with shaft 16 such that the shaft is wedged between the face 24 of the cam and the abutment 20.

Once the shaft is wedged between the cam face 24 and abutment 20, any attempt to pull out the shaft (in an axial direction opposite insertion direction 17) will generate a frictional force F at the shaft-cam interface which is in the direction of the insertion direction 17. Hence, the static equilibrium of the cam predicates the following equation:

$$M + F.r - N.b = 0 \qquad (1)$$

where:

M is the torque imposed by the spring 30;
r is the radius of the radiused face 24 of the cam 22;
N is the normal (i.e. perpendicular) force on the shaft;
F is the friction force acting tangentially on the cam 22; and
b is the offset distance of the generating radius.

This equation contains two unknowns, viz. F and N, which therefore cannot be uniquely determined. However, we can summon a second equation $$F = \mu N \qquad (2)$$

in which $\mu$ is the coefficient of friction. Therefore, we now have 2 equations with 2 unknowns, and hence these unknowns can be determined. From (2) it follows that $$N = F/\mu \qquad (3)$$

which if substituted into (1) yields $$M + F.r - F.b/\mu = 0 \qquad (4)$$

This equation contains only one unknown F, therefore it can be solved for this quantity. Accordingly, from equation (4), $$F = M\mu/b - \mu r \quad (5)$$

It is now obvious that if the denominator of the right-hand side of this relation vanishes, then F becomes infinite and hence the shaft cannot be withdrawn since it would take an infinitely large force to do so, which of course is not available. In other words, the device becomes self-locking. The condition of self-locking, therefore, is $$b \leq \mu r \quad (6)$$

or, by reference to FIG. 2, $$\mu \geq b/r = \tan \phi \quad (7)$$

Note the absence of M (spring generated torque) in (6) and (7). Therefore, the condition of self-locking is independent of the magnitude of this torque. That is, the spring generated torque is only necessary to establish the initial physical contact between the shaft and the cam, whereupon this torque's role to maintain the self-locking status of the device is zero. As a consequence, the magnitude of this moment, and hence the size of its generating spring, can be conveniently small, which facilitates construction.

The actual construction of the device must fulfil two fundamental conditions. Firstly, the maximum theoretical penetration of the cam to the shaft must not be less than a critical value $q_c$, else the cam face will not wedge the shaft in place and the cam will simply rotate past the shaft. And secondly, to achieve self-locking, equation (7) must be satisfied. With reference to FIG. 2, the first of these conditions makes it mandatory that:

$$(r^2 + b^2)^{\frac{1}{2}} - b \geq q_c \quad (8)$$

while, by (7), the equation must satisfy $$\phi \leq \arctan \mu \quad (9)$$

Figure 3:
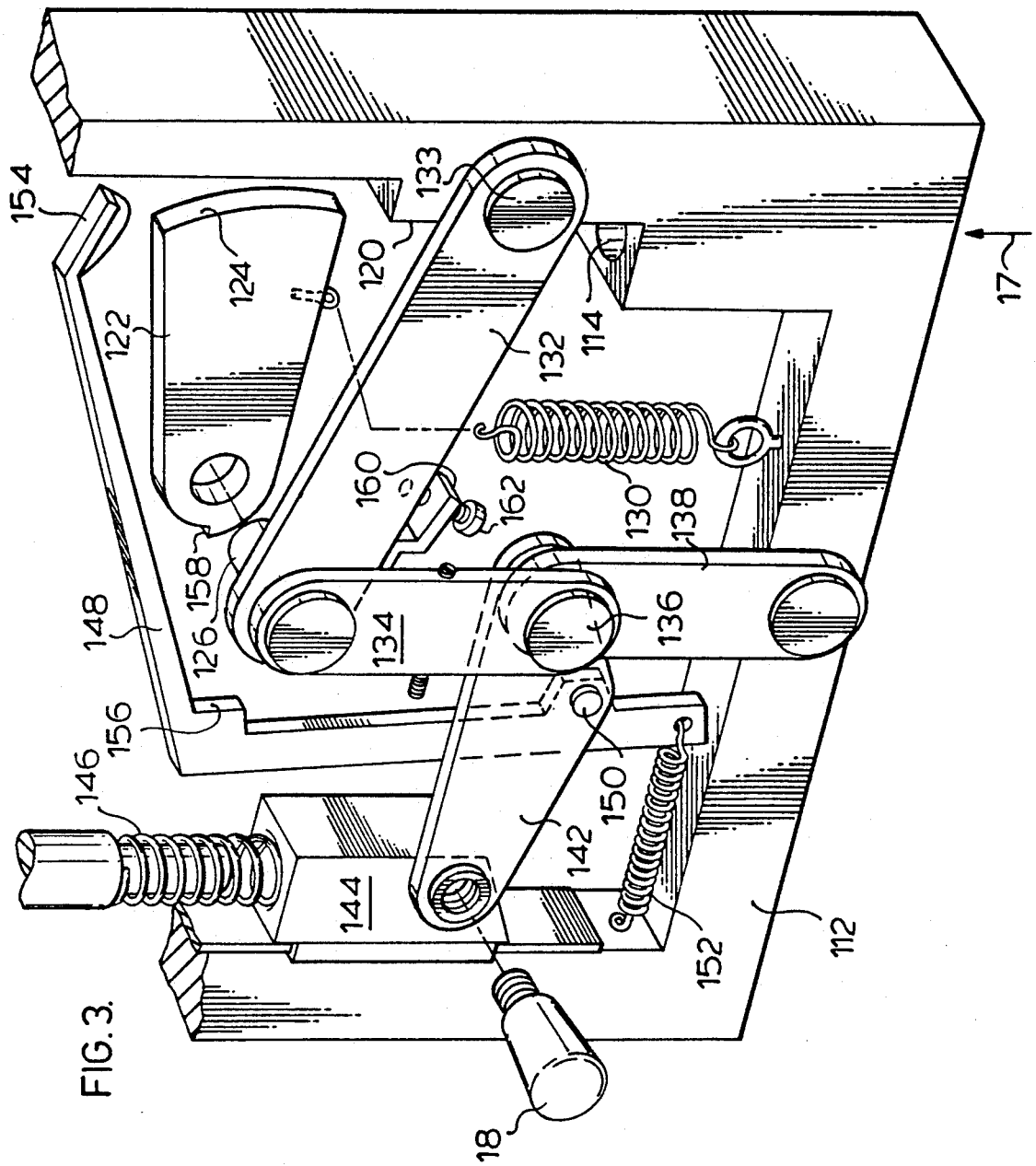
FIG. 3 is an exploded perspective view of the apparatus of this invention.

With reference now to FIG. 3, which illustrates the inside of housing 12, a frame 112 has an abutment 120 and shaft receiving opening 114.

A cam 122 is supported for rotation on pivot 126. The cam has a convexly radiused face 124. The cam is rotated in a clockwise direction by spring 130.

The pivot 126 is supported by one end of link arm 132. The other end of the link arm 132 is pivotally supported on frame 112. Pivot 126 is also supported by one end of the link arm 134. The other end of link arm 134 terminates at pivot 136. Link arm 138 extends between pivot 136 and pivot 140 on frame 112. A further link arm, arm 142, extends between pivot 136 and is pivotally joined at its other end to slider block 144. A spring 146 biases slider block 144 to a rest position.

A pivot 150 mounted to link arm 142 attaches a lever 148 to the link arm 142. A spring 152 at one end of lever 148 biases the free end 154 of the lever toward a position such that the free end is in the path of any shaft inserted axially through the shaft receiving opening 114. A medial lug formed on the lever may be received by a notch 158 in the cam 122 in order to stop the cam in a stop position against the urging of spring 130 such that the radiused face 124 is not at its closest approach to the abutment 120.

Slider block 144 receives shaft release lever 18.

A flange 160 depending from link arm 132 supports a screw 162 which acts as a stop to limit the rotation of cam 122 in a clockwise direction.

As described, the cam is constrained to rotate through an arc between a stop position whereat the notch 158 of the cam receives the lug 156 of the lever 148 and a stop position whereat the cam abuts screw 162. Throughout this arc, the cam face 124 is generally opposed to the abutment 120. As with the cam 22 described in connection with the schematic of FIG. 2, the radiused face 124 of cam 122 has a generating radius which is offset above the axis of the pivot 126, thus this offset is approximately in the insertion direction.

The operation of the apparatus of FIG. 3 is now described in connection with FIGS. 4 through 6.

Figure 4:
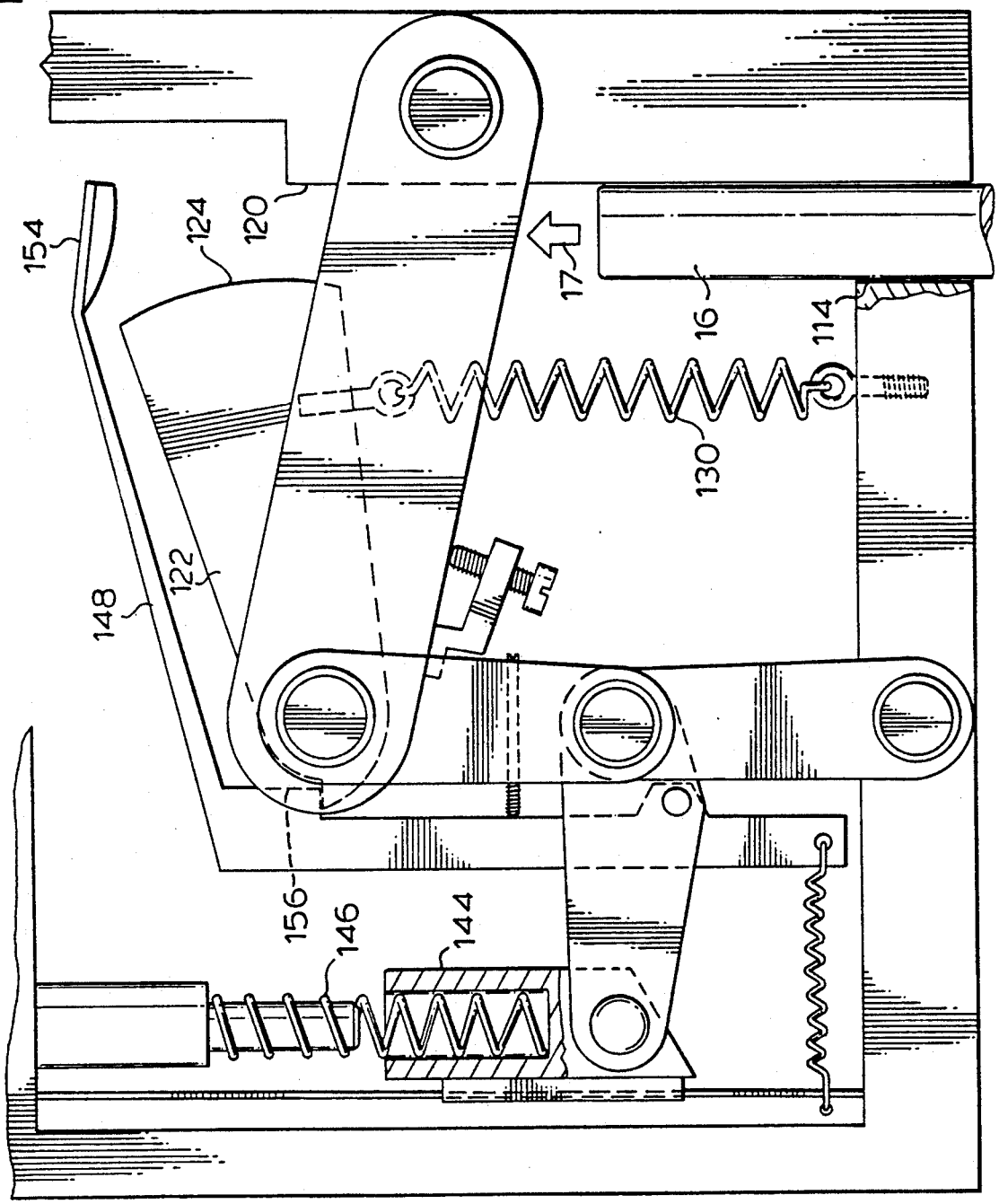

Prior to insertion of a shaft to a holding position whereat it is held within the apparatus, the apparatus is in the set position shown in FIG. 4. In this position, lug 156 of the lever 148 is received within notch 158 of the cam 122. This stops the cam in a stop position against the urging of spring 130. With the lever 148 in this position, the free end 154 of the lever is in the path of a shaft 16 which is inserted through opening 114 in the insertion direction 17. It is noted that in the set position the lateral distance between the cam face 124 and the abutment 120 is chosen so that it is slightly greater than the diameter of shaft 16. Consequently, shaft 16 freely moves between the abutment and the cam face while it is moved in the insertion direction and before the shaft abuts the free end 154 of the lever 148. It is also noted that in the set position, slider block 144 is in its rest position to which it is urged by spring 146.

Figure 5:
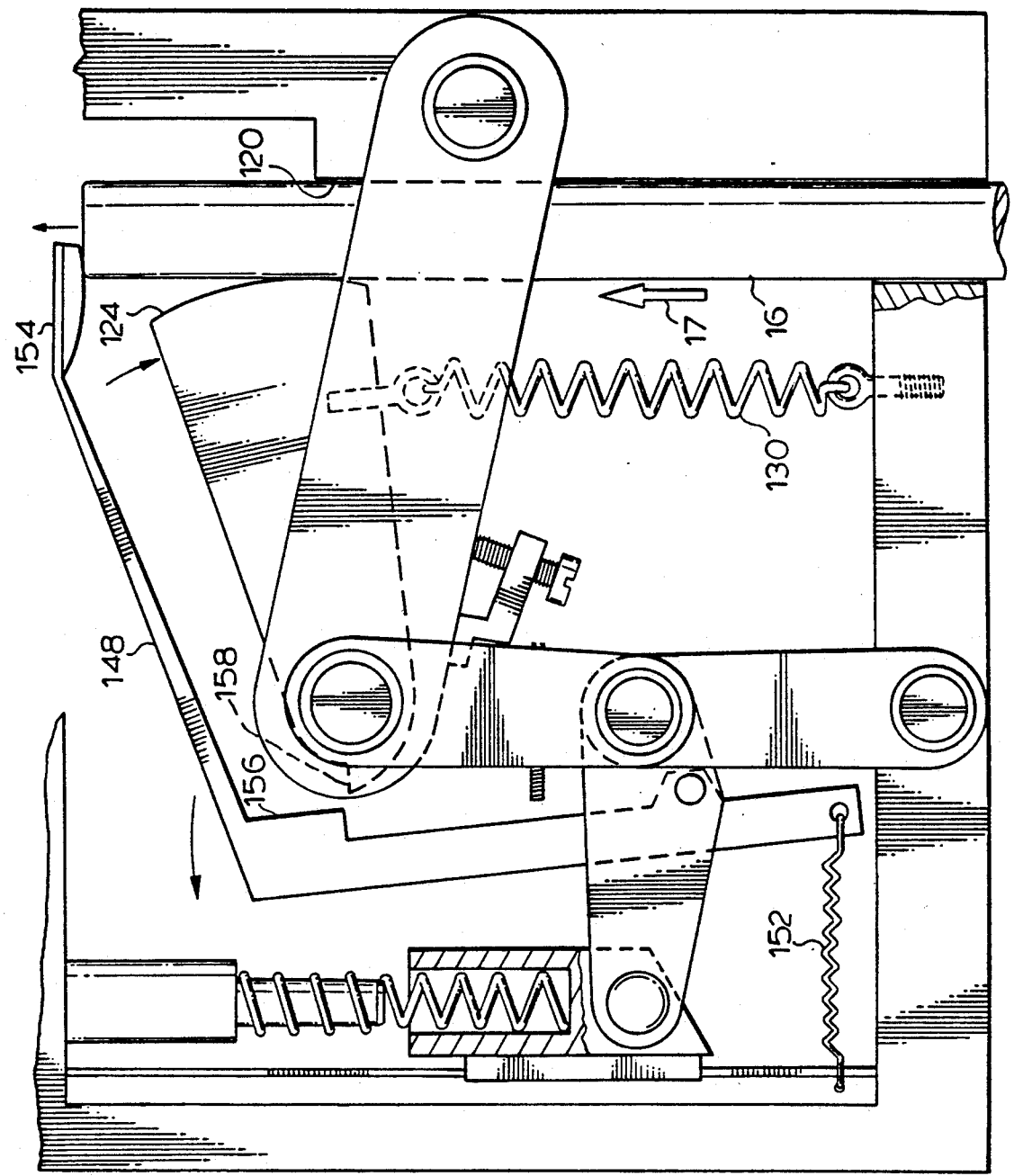

Turning now to FIG. 5, as shaft 16 is pushed further into the apparatus in insertion direction 17, it abuts the free end 154 of lever 148 and rotates this lever counter-clockwise against the urging of spring 152 so as to withdraw the lug 156 of the lever from the notch 158 of the cam. Once this occurs, the cam is free to rotate in a clockwise direction under the urging of spring 130. However, because of the eccentricity of the generating radius for the face 124 of the cam, clockwise rotation of the cam brings face 124 progressively closer to abutment 120. This wedges shaft 16 between the cam face 124 and the abutment 120. As soon as this occurs, as described hereinbefore in connection with FIG. 2, any attempt to axially withdraw the shaft will merely amplify the wedging effect since the eccentric radiused face will attempt to move closer to the abutment. Accordingly, once the shaft I 6 has been inserted to the point where it has rotated lever 1 48 to release the cam, the shaft has been inserted to a holding position from which it cannot be withdrawn.

Turning now to FIG. 6, in order to release a shaft 16 inserted in the apparatus to a holding position, the release lever which is attached to slider block 144 is raised against the force of spring 146. This moves the end of link 142 which is pivotally joined to slider block 144 upwardly which causes pivot 136 to move laterally away from abutment 120. This, in turn, acts on link arm 134 and link arm 132 in order to rotate link arm 132 in a counter-clockwise direction. Since pivot 126 is positioned upwardly of pivot 133, counter-clockwise rotation of link arm 132 moves pivot 126 away from abutment 120 in a lateral direction with no component of motion in the insertion direction 17. In turn, this moves cam 122 laterally away from the abutment in order to release shaft 16. The cam 122 then rotates until stopped by limiting screw 162.

It is noted that the pivoting of link arm 142 raises lever 148 due to the connection of the lever 148 to the link arm 142 by pivot 150. Accordingly, if shaft 16 is then removed from the apparatus 10, slider block 144 may be returned to its rest position which will result in lug 156 of the lever arm re-entering the notch 158 of the cam 122 and forcing the cam back to the set position illustrated in FIG. 4.

It will be noted that the force required to release the shaft is independent of the load on the shaft. Accordingly, the shaft may be released even when under a full load without damaging apparatus 10. Further, the shaft could be oily or greasy and this will not negatively effect the holding ability of apparatus 10. Also, there is no shaft creep under load.

It will be seen from the foregoing that a featureless shaft may be inserted into the apparatus with very little force. However, once the shaft reaches a holding position, it cannot then be pulled out.

While the apparatus of this invention has been described in connection with its use with a featureless shaft, it will be apparent the apparatus will function with certain featured shafts having a circular outline, such as a fluted shaft. Modifications will be apparent to those skilled in the art and, accordingly, the invention is defined in the claims.

What is claimed is:

1. Apparatus for holding a shaft which is inserted axially therein in an insertion direction to a holding position, comprising:

a fixed abutment for abutting the side of a shaft;

a cam terminating in a convexly radiused face, said cam mounted for rotation about a cam pivot through an arc such that said face remains generally opposed to said abutment, said cam pivot being beside said abutment and oriented such that a shaft, when abutting said abutment, is in the plane of rotation of said cam;

the centre of the generating radius of said radiused face being offset from said cam pivot generally in said insertion direction;

means for urging said cam to rotate about said cam pivot in a direction opposite said insertion direction; and a translatable pivot mount for translating said cam pivot to a first position more proximate to said abutment and to a second position more distal from said abutment such that, when said cam pivot is in said first position, said radiused face of said cam abuts a shaft inserted axially along said abutment in said insertion direction to said holding position, and when said cam pivot is translated to said second position by said translatable pivot mount, said radiused face is drawn out of abutment with any shaft at said holding position, whereby a shaft inserted to said holding position when said cam pivot is in said first position is wedged between said abutment and said cam face and any withdrawal force on said shaft wedges said shaft more tightly between said cam face and said abutment and whereby when said cam pivot is moved to said second position, said shaft is released.

2. The apparatus of claim 1 including stop means to stop said cam against the urging of said urging means in a stopped position such that said radiused face is not at its closest approach to said abutment and means to release said cam from said stopped position upon insertion of a shaft to said holding position such that said radiused face of said cam is then urged into abutment with said shaft.

3. The apparatus of claim 2 including a cylindrical opening for guiding a shaft along said abutment to said holding position.

4. The apparatus of claim 2 wherein said stop means and said release means comprise a lever having a lug for reception by a notch in said cam in order to stop said cam in said stopped position and a free end in the path of a shaft inserted in said insertion direction whereby insertion of a shaft to said holding position deflects said lever to release said lug from said notch in order to release said cam.

5. The apparatus of claim 4 including limit means to limit the rotation of said cam when said cam pivot is translated to said second position.

6. The apparatus of claim 1 wherein said cam is constructed of such a material that the co-efficient of friction between said cam and a shaft inserted to said holding position is at least as great as the ratio of said offset and the distance between said cam pivot and the point whereat said face of said cam contacts said shaft.

7. The apparatus of claim 1 wherein said translatable pivot mount translates said cam pivot from said first position to said second position along a path having no component in said insertion direction.

8. The apparatus of claim 7 wherein said translatable pivot mount comprises a first link arm mounted to said cam pivot and pivotally joined to a second link arm at a translatable pivot, said second link arm being pivotally mounted to a support at a support pivot, and a third link arm pivotally joined to said cam pivot and to a support, said first, second, and third link arms arranged such that said translatable pivot may be positioned in-line with said cam pivot and support pivot whereupon said translatable pivot, cam pivot and support pivot define a line parallel to said insertion direction and said cam pivot is in said first position, said translatable pivot being translatable in order to move said cam pivot to said second position, and including means to releasably retain said translatable pivot in said in-line position.

* * * * *